(12) United States Patent
Dornen et al.

(10) Patent No.: US 12,523,082 B2
(45) Date of Patent: Jan. 13, 2026

(54) ACTIVATABLE DRIVE DEVICE

(71) Applicants: Edscha Engineering GmbH, Remscheid (DE); BAYERISCHE MOTOREN WERKE AKTIENGESELLSCHAFT, Munich (DE)

(72) Inventors: Jörg Dornen, Remscheid (DE); Jochen Bals, Remscheid (DE); Enrico Horn, Munich (DE)

(73) Assignees: Edscha Engineering GmbH, Remscheid (DE); BAYERISCHE MOTOREN WERKE AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/287,078

(22) PCT Filed: Apr. 13, 2022

(86) PCT No.: PCT/DE2022/100284
§ 371 (c)(1),
(2) Date: Oct. 16, 2023

(87) PCT Pub. No.: WO2022/218475
PCT Pub. Date: Oct. 20, 2022

(65) Prior Publication Data
US 2024/0200386 A1    Jun. 20, 2024

(30) Foreign Application Priority Data
Apr. 16, 2021 (DE) .................... 20 2021 102 062.8

(51) Int. Cl.
*E05F 15/622* (2015.01)
*F16H 25/20* (2006.01)

(52) U.S. Cl.
CPC .......... *E05F 15/622* (2015.01); *F16H 25/20* (2013.01); *E05Y 2900/50* (2013.01);
(Continued)

(58) Field of Classification Search
CPC ................. F16H 25/02; F16H 25/2021; F16H 2025/2071; F16H 2025/209; E05F 15/622
See application file for complete search history.

(56) References Cited

U.S. PATENT DOCUMENTS 8,286,770 B2   10/2012   Scheck et al.
8,766,563 B2    7/2014   Eggeling et al.
(Continued)

FOREIGN PATENT DOCUMENTS

DE   102006052200 A1   5/2008
DE   102008061115 A1   6/2010
(Continued)

OTHER PUBLICATIONS

Corresponding Search Report PCT/DE2022/100284.

*Primary Examiner* — Minnah L Seoh
*Assistant Examiner* — Gregory T Prather
(74) *Attorney, Agent, or Firm* — Davidson Kappel LLC

(57) ABSTRACT

A drive device, in particular a spindle drive for a vehicle panel, including a housing, a drive element which extends along a drive axis, an output element which extends along an output axis, and a coupling device which is arranged between the drive element and the output element which has at least one first coupling element for coupling the drive element and the output element. The coupling device can be moved from a decoupling position into a coupling position, which couples the drive element and the output element together, by actuating the drive element.

13 Claims, 12 Drawing Sheets

(52) U.S. Cl.
CPC .. *F16H 25/2021* (2013.01); *F16H 2025/2071* (2013.01); *F16H 2025/209* (2013.01)

(56) References Cited

U.S. PATENT DOCUMENTS

| | | |
|---|---|---|
| 2007/0096377 A1 | 5/2007 | Hanna et al. |
| 2015/0376929 A1* | 12/2015 | Scheuring ............... F16D 43/21 74/89.38 |
| 2021/0017801 A1 | 1/2021 | Meurer et al. |

FOREIGN PATENT DOCUMENTS

| | | |
|---|---|---|
| DE | 102013017453 A1 | 4/2015 |
| DE | 102015201705 A1 | 8/2015 |
| DE | 102016112540 A1 | 1/2018 |
| EP | 3767061 A1 | 7/2019 |
| WO | WO2010046008 A1 | 4/2010 |

\* cited by examiner

ACTIVATABLE DRIVE DEVICE

The present disclosure relates to a drive device, in particular a spindle drive for an adjustable vehicle panel and a telescopic linear guide. The present disclosure further relates to a method for subsequent activation of a motor-driven adjustment of a vehicle panel.

BACKGROUND

In practice, drive devices, in particular for driven adjustable vehicle panels, are known, which are arranged in an articulated manner between a vehicle body and a vehicle panel to be adjusted relative to the vehicle body, such drive devices comprising a drive element via which, for example, an output element designed as a spindle rod is rotated in order to thereby bring about a change in length of the drive device and accordingly to hereby realize a driven adjustment of the vehicle panel. It is hereby advantageously possible to automatically adjust a vehicle panel between an open and closed position. Usually, such drive devices or the associated possibility of automatic adjustment of a vehicle panel can optionally be selected by a customer when the vehicle is purchased, a subsequent provision of this comfort function being possible only by appropriate retrofitting, which must be carried out in a workshop.

However, it is now known from other areas of the vehicle to install optional functions as standard by means of hardware technology and to allow subsequent activation of the corresponding optional function by the end customer in exchange for a fee. This is known, for example, for special equipment such as seat or steering wheel heating. Advantageously, a purchaser of the vehicle can carry out a retrofitting of corresponding special equipment him/herself without searching for a workshop, by virtue of the purchaser activating the desired special equipment him/herself, for example by entering an unlocking code in an app.

SUMMARY

It is an object of the present disclosure to provide a drive device or a telescopic linear guide, in particular a spindle drive for a pivotable vehicle panel, which is subsequently activatable and compact for use of a motor-driven adjustment of a vehicle panel. It is a further object of the present disclosure to provide a method for activating a motor-driven adjustment of a vehicle panel, which makes it possible to implement the retrofitting of a motor-driven adjustment possibility of a vehicle panel in a cost-effective and simple way.

According to one aspect of the present disclosure, a drive device, in particular a spindle drive for a vehicle panel, is provided, comprising a housing, a drive element which extends along a drive axis, an output element which extends along an output axis, and a coupling device arranged between the drive element and the output element with at least one first coupling element for coupling the drive element and the output element. The drive device according to the present disclosure is characterized in that the first coupling element can be displaced from a decoupling position into a coupling position, in which the drive element and the output element are coupled to one another, by actuating the drive element. This advantageously makes it possible to subsequently activate the drive device for driving the output element by performing only a first actuation of the drive element at the activation time, which then leads to a coupling of the drive element to the output element. Subsequently, the vehicle panel can now be moved, as usual, by actuating the drive element within the drive device between an open and closed position by means of the drive device.

In a preferred development, it is provided that the first coupling element is coupled to the drive element and decoupled from the output element before actuation of the drive element or in the decoupling position of the coupling device. It is hereby advantageously ensured that even when the drive device is already installed in the vehicle as standard, a drive for the automatic movement or pivoting of a vehicle panel is only connected or activated after the first actuation of the drive element. Advantageously, a user of the vehicle can initially only manually open and close the vehicle panel, due to the initially present decoupled state or the initially present decoupling position of the coupling device, no increased resistance occurring due to the drive element or the motor driving the drive element. Only the resistance of the output element itself must be overcome by the manual actuation of the vehicle panel.

In a preferred embodiment of the drive device, it is provided that the first coupling element is displaced axially in a direction parallel to one of the drive axis and output axis by actuating the drive element. The first coupling element and the output element can expediently be spaced apart from one another in the decoupling position, insofar as the first coupling element is displaced axially in the direction parallel to the drive axis and the first coupling element and the output element are not arranged coaxially to one another. Particularly preferably, the first coupling element is displaceable axially in a direction parallel to the output axis by actuating the drive element in the direction of a coupling position. Advantageously, the first coupling element and the output element can be arranged coaxially to one another so that a coupling between the first coupling element and the output element to be produced by the actuation of the drive element is possible in a particularly reliable and simple way.

In an advantageous development, the first coupling element and the drive element, in the decoupling position of the coupling device, are in a threaded or gear engagement. In a preferred embodiment, it is further provided that the drive element is rotatable in a driven manner about the drive axis. Advantageously, a particularly secure and reliable coupling of the first coupling element to the drive element in the decoupling position of the coupling device is ensured, a torque transmission between the drive element and the first coupling element is preferably also being made possible, which is required in any case in the embodiment of the drive device as a spindle drive.

In a particularly preferred development, it is provided that the first coupling element is displaced axially into the coupling position by rotating the drive element about the drive axis. Advantageously, the production of a coupling of the drive element to the output element requires only the actuation or rotation of the drive element necessary anyway for the motorized adjustment of a vehicle panel, said actuation generally being driven by a motor designed as an electric motor.

The first coupling element preferably has a thread which, in the decoupling position of the coupling device, is in engagement with a mating thread, the first coupling element being displaced into the coupling position by mutual rotation of the thread and of the mating thread. An axial displacement of the first coupling element relative to the mating thread can advantageously be brought about by rotating one of the thread and mating thread.

In a particularly preferred embodiment, the mating thread is arranged stationarily relative to the drive element. This advantageously ensures that a controlled displacement of the first coupling element relative to the drive element is possible. In particular, a reliable and largely low-maintenance configuration of the coupling device is also advantageously realized as a result.

In a preferred development, the thread is designed as an internal thread and the mating thread is designed as an external thread. In an alternative development, the thread is designed as an external thread and the mating thread is designed as an internal thread. This advantageously ensures a mutual radial guidance of the first coupling element relative to the mating thread, the first coupling element also being precisely axially displaced by relative rotations of the thread in relation to the mating thread. It is particularly advantageously provided that the mating thread is arranged concentrically to one of the drive axis and output axis.

In a first preferred embodiment, the mating thread is arranged on the housing. Expediently, the housing has a cavity, which is enclosed by the housing and in which the mating thread is arranged. Preferably, the mating thread is arranged concentrically around the output axis. Advantageously, no additional component is required for the mating thread and it can be produced cost-effectively even during the manufacture of the housing or a housing part belonging to the housing. The drive element preferably drives a rotation of the first coupling element about the output axis, the first coupling element being displaced axially into the coupling position by the rotation of the first coupling element about the output axis, which rotation is driven by the drive element.

In an alternative embodiment, the mating thread is arranged on the drive element. Preferably, the drive element is rotatable about the drive axis so that, when the drive element is actuated or rotated about the drive axis, an axial displacement of the first coupling element can take place. Advantageously, the drive element can both provide a drive of the output element in the coupling position of the coupling device in a cost-effective and reliable way and drive the previously required axial displacement of the first coupling element into the coupling position due to the mating thread provided on the drive element.

In the event that the mating thread is arranged on the drive element, the first coupling element is preferably arranged in a rotationally fixed manner in the housing, at least in the decoupling position, so that relative rotations of the thread and the mating thread are possible. In the coupling position of the coupling device, it is preferably provided that the drive element is coupled to the first coupling element in a rotationally fixed manner and drives a rotation of the coupling element relative to the housing.

In a preferred embodiment, it is provided that the output element has a coupling portion and the first coupling element has a mating coupling portion. The coupling portion and the mating coupling portion are expediently provided to produce a coupling between the output element and the first coupling element.

Expediently, in the decoupling position of the coupling device, the coupling portion of the output element and the mating coupling portion of the first coupling element are axially spaced apart from one another in the direction of the output axis. Accordingly, there is then no coupling between the output element and the first coupling element or no coupling between the output element and the drive element, since the drive element is preferably coupled to the first coupling element. Further expediently, it is provided that, in the coupling position of the coupling device, the coupling portion of the output element and the mating coupling portion of the first coupling element overlap axially in the direction of the output axis. Preferably, in the coupling position of the coupling device, a rotationally interlocking connection exists between the coupling portion of the output element and the mating coupling portion of the first coupling element.

In a preferred embodiment, it is provided that an outer spline is arranged in the coupling portion and extends along the output axis, and in the mating coupling portion of the first coupling element there is arranged an inner spline which is formed complementarily to the outer spline and extends longitudinally along the output axis. The mating coupling portion preferably radially surrounds the coupling portion. Alternatively, however, it can also be provided that the coupling portion radially surrounds the mating coupling portion. For this case, an inner spline is arranged in the coupling portion and an outer spline formed complementarily to the inner spline is arranged in the mating coupling portion. Advantageously, in the case of an axial overlap of the coupling portion and of the mating coupling portion, a rotationally interlocking connection is produced by meshing the inner spline and the outer spline.

Particularly preferably, the output element is designed as a spindle rod with an external thread. The drive device is advantageously designed as a spindle drive. The drive device expediently comprises a spindle nut which is in threaded engagement with the external thread of the spindle rod. The spindle rod is preferably mounted rotatably about the output axis.

In a first preferred embodiment, the first coupling element is designed as a worm gear that is rotatable about the output axis. Advantageously, the rotatable worm gear is arranged concentrically about the output element designed as a spindle rod. Preferably, the worm gear has an inner spline along an inner circumference and the spindle rod has an outer spline along an outer circumference, which can be brought into engagement with one another by axial displacement of the worm gear along the output axis.

In a first preferred development, the drive element is designed as a worm shaft, the first coupling element designed as a worm gear being in threaded engagement with the worm shaft. By rotating the drive element about the drive axis, a rotation of the coupling element designed as a worm gear about the output axis can advantageously be driven, the first coupling element designed as a worm gear thereby being displaced into the coupling position.

In an advantageous embodiment, it is provided that the coupling device comprises a biasing means which biases the coupling device in the direction of the coupling position. It is particularly preferably provided that the biasing means biases the first coupling element in the direction of the coupling position. It is thus advantageously ensured that the transition from the decoupling position to the coupling position is reliably and securely achieved.

In a first preferred development of the drive device, the biasing means is designed as a compression spring, in particular a disk spring assembly or a coil spring and is arranged between a stop face within the housing and the first coupling element. The drive device advantageously comprises a brake device. The brake device is preferably designed as a multi-disk brake with a brake disk assembly. The brake disk assembly is expediently biased by the biasing means designed as a compression spring in order to provide a braking force.

In an advantageous development, the coupling device comprises a second coupling element. This advantageously makes it possible to bring about an axial displacement of the first coupling element into the coupling position with the output element by actuating the drive element, the second coupling element being displaced together with the first coupling element and establishing a coupling with the drive element.

The first coupling element is preferably arranged concentrically to the output axis. Advantageously, a coupling between the first coupling element and the output element can thus take place by axial displacement of the first coupling element.

According to one aspect of the present disclosure, a telescopic linear guide for a panel of an automobile is provided, in particular designed as a spindle drive with a spindle rod and a spindle nut, the telescopic linear guide permitting a regular manual actuation, it being possible for an electric drive device to be selectively activated in order to convert the telescopic linear guide into an electric linear drive, an activation, preferably by an electrical signal, causing the drive device to come into operative engagement with the linear guide. As a result, a telescopic linear guide for a panel of an automobile, in particular designed as a spindle drive, can be delivered, which is not driven by a motor during regular operation, but follows a manual actuation, the manual actuation pulling out or compressing the telescopic linear guide. In the embodiment as a spindle drive, the spindle rod is then driven by the change in length via the spindle nut, it being possible for the spindle nut to rotate without braking. After activation, which converts the telescopic linear guide into an electric linear drive, the drive device drives the spindle rod, and the spindle rod displaces the two telescopic parts in one direction or the other by means of the spindle nut.

A regular manual actuation is present when the non-electrically driven telescopic linear guide is actuated by hand without, for example, a slip clutch having to be overcome with a raised resistance torque.

It is advantageous if the drive device has a slip clutch in order to allow irregular manual actuation of the electric linear drive in the event of a malfunction. However, the resistance to be overcome for an irregular manual actuation is significantly increased compared to regular manual actuation.

The drive device is preferably arranged completely in a drive housing assigned to the linear guide, in particular in a drive housing assigned to the spindle rod. As a result, the drive device is protected against access from the outside and can only come into operative engagement with the linear guide when external activation authorization is provided. The drive device is expediently injection-molded into the drive housing. This also advantageously prevents other drives from being externally attached to the linear guide.

The telescopic linear guide is preferably characterized by at least some or a plurality of the features of an above-described drive device according to the present disclosure. It is understood that, in particular, subsequent activation can also be achieved with other means or methods without having to remove or even disassemble a telescopic linear guide.

According to a further aspect of the present disclosure, a method for activating a motor-driven adjustment of a vehicle panel by means of a drive device according to the present disclosure is provided. In a first step, the method comprises manually adjusting the drive device to a first end position. In a second step, a drive element is actuated within the drive device by activation of a motor. In a third step, a first coupling element, which is in engagement with the drive element, of a coupling device arranged within the drive device is displaced into a coupling position which couples together the drive element and an output element to be driven by the drive element. In a fourth step, the drive device is moved from the first end position in the direction of a second end position by further actuation of the drive element in the coupling position of the coupling device. Advantageously, the option of a motorized adjustment of a vehicle panel can also be activated subsequently by carrying out the method according to the present disclosure.

Advantageously, by means of the above method, the electrical function of the drive device can be subsequently activated, for example by an app or by actuating an interface provided on the drive device, no costly and time-consuming retrofitting in a workshop being necessary for this purpose. Rather, the drive device according to the present disclosure is installed as standard in a vehicle, the customer being able to decide him/herself whether and when he/she would like an electrical adjustment of the vehicle panel and being able to independently activate and then use this function immediately after booking.

According to one aspect of the present disclosure, a telescopic linear guide is also provided which comprises means for carrying out the above method; according to one aspect of the present disclosure, an electric drive device is also provided as a direct process product which has been activated by the above method from a telescopic linear guide.

Further advantages, developments and properties of the present disclosure can be found in the following description of a number of preferred exemplary embodiments.

BRIEF SUMMARY OF THE DRAWINGS

The present disclosure is explained in greater detail below with reference to the accompanying drawings using a plurality of preferred exemplary embodiments.

DETAILED DESCRIPTION

Figure 1:
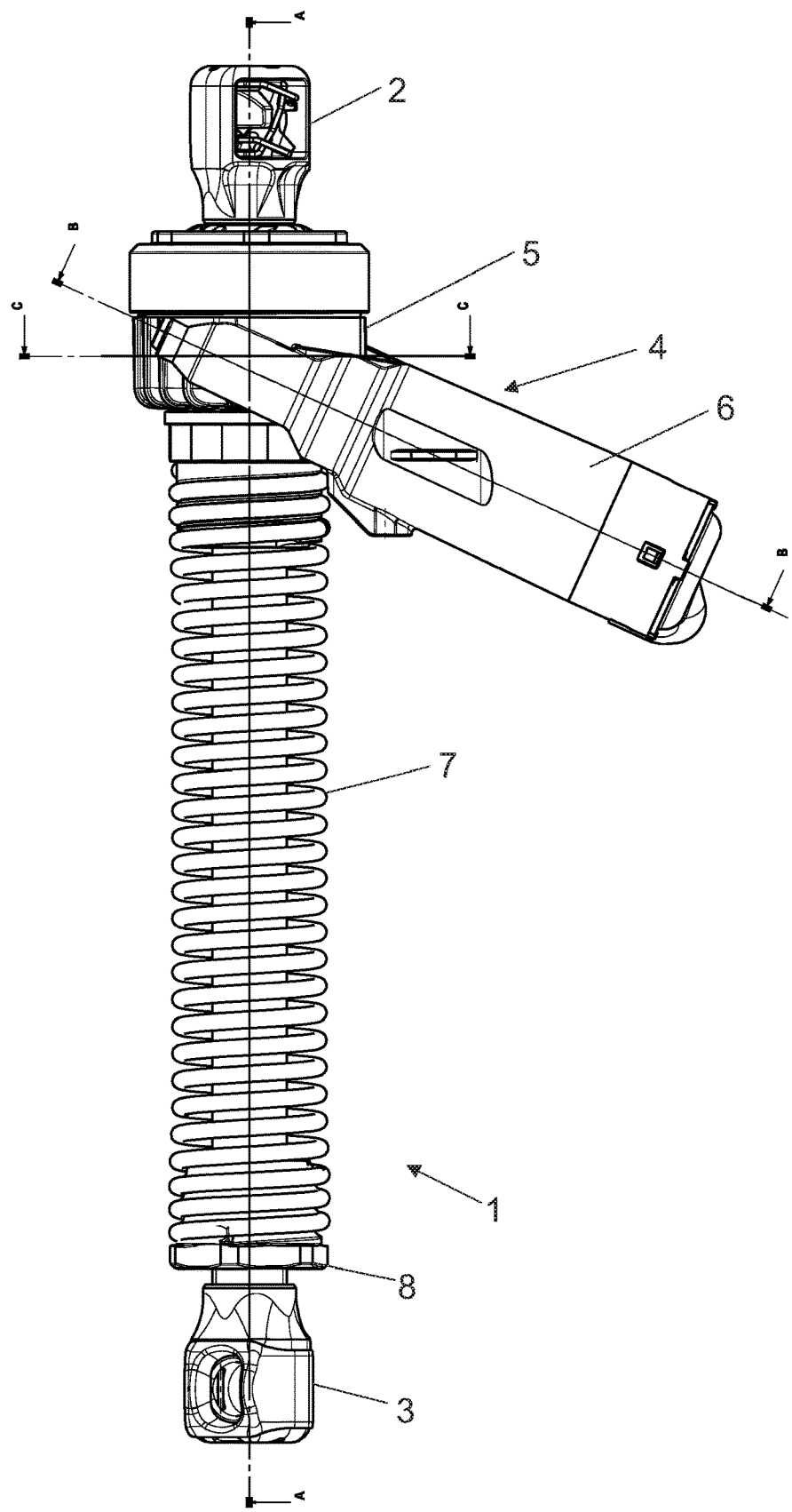
FIG. 1 shows a first exemplary embodiment of a drive device according to the present disclosure in a front view.

FIG. 1 shows a preferred first exemplary embodiment of a drive device 1 according to the present disclosure in a front view. The drive device 1 comprises a first joint part 2 formed as a ball socket and a second joint part 3 formed as a ball socket, which are arranged at opposite ends of the drive device 1. The first joint part 2 and the second joint part 3 expediently serve to connect the drive device 1 in an articulated manner between a vehicle body and a vehicle panel, such as a vehicle side door, a roof panel or a tailgate, which is connected so as to be pivotable or displaceable relative to the vehicle body, in order to support or drive a pivoting or displacement of the vehicle panel.

Furthermore, the drive device 1 comprises a drive train 4 with a housing 5 and a motor 6 arranged in the housing 5, which motor makes it possible to drive a change in length of the drive device 1 by means of the drive device and thus to bring about an automatic pivoting or displacement of the vehicle panel connected to the drive device 1. Further, the drive device 1 comprises a spring part 7 configured as a coil spring, which is arranged between the housing 5 of the drive train 4 coupled to the first joint part 2 and a connection element 8 coupled to the second joint part 3. Advantageously, the spring part 7 supports a manual opening movement and/or a manual closing movement of the vehicle panel, so that a force to be applied by the user during a manual pivoting or displacement of the vehicle panel is as low as possible. The spring part 7 can cause both a biasing of the first joint part 2 in the direction of the second joint part 3 and a biasing of the first joint part 2 in the direction away from the second joint part 3, so that the spring part 7 can be supportively effective in both an opening direction and a closing direction of the panel.

Figure 2:
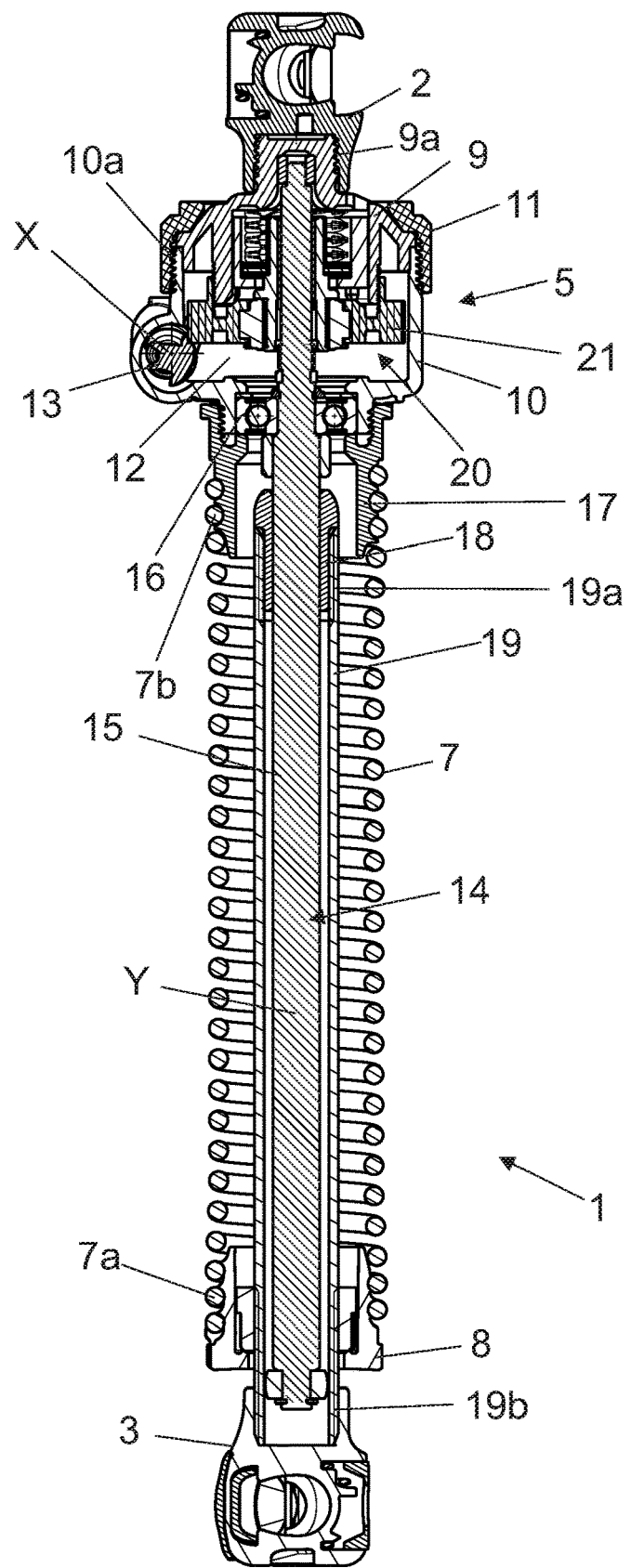
FIG. 2 shows the drive device from FIG. 1 in a longitudinal sectional view along the line of section A-A shown in FIG. 1.

FIG. 2 shows the drive device 1 from FIG. 1 in a longitudinal sectional view along the line of section A-A shown in FIG. 1. In this illustration, it can be seen that the first joint part 2 is firmly connected to a first housing part 9 of the housing 5 of the drive train 4 by a screw connection. For this purpose, the first housing part 9 has a screw thread 9a arranged at the end, onto which the first joint part 2 is screwed and thus fastened. The housing 5 further comprises a second housing part 10, which is connected to the first housing part 9 by a union nut 11. For this purpose, the union nut 11 is screwed onto a thread 10a provided on an outer side of the second housing part 10. Advantageously, this allows the housing 5 to be easily assembled and, if necessary, also opened or disassembled again. In particular, components located in the housing 5 can be easily replaced.

A drive element 13 arranged on the motor (not shown here, cf. FIG. 3, reference sign 6) projects into a cavity 12 enclosed by the housing 5 or is arranged in the cavity 12. In the exemplary embodiment of a drive device 1 shown here, the drive element 13 is designed as a worm shaft which extends along a drive axis X protruding at an angle from the plane of the paper and can be driven rotatably about this drive axis X by the motor.

The drive device 1 further comprises an output element 14 extending along an output axis Y In the exemplary embodiment shown here, the output element 14 is designed as a spindle rod with an external thread 15. The spindle rod is rotatably mounted in a ball bearing 16, the ball bearing 16 being arranged in the second housing part 10 of the housing 5 and being axially fixed by a second connection element 17 fastened to the second housing part 10 by means of a screw connection. The spindle rod 14 is thus advantageously rotatable about the output axis Y Furthermore, it can be seen that the spring part 7 is axially fastened to the first connection element 8 with a first end 7a and to the second connection element 17 with a second end 7b, so that the spring part 7, which is designed as a coil spring, can bias the first connection element 8 with respect to the second connection element 17. In the exemplary embodiment shown here, the spring part 7 biases the first connection element 8 with respect to the second connection element 17 in such a way that a vehicle panel is biased in the opening direction.

In the exemplary embodiment shown here, the drive device 1 is designed as a telescopic spindle drive and, in addition to the spindle rod 14, further comprises a spindle nut 18, which is in threaded engagement with the external thread 15 of the spindle rod 1. The spindle nut 18 is arranged stationarily and in a rotationally fixed manner on a first open end 19a of a guide tube 19, so that a rotation of the spindle rod 15 causes a displacement of the guide tube 19 along the output axis B. At a second end 19b of the guide tube 19 opposite the first end 19a, the second joint part 3 is fastened by screw connection, so that the distance between the first joint part 2 and the second joint part 3 can be varied by rotation of the spindle rod 14 or the external thread 15, respectively, or, in the event of an external force acting on the first joint part 2 or the second joint part 3, an axial displacement of the guide tube 19 takes place under a rotation of the output element 14 formed as a spindle rod.

The drive device 1 further comprises a coupling device 20 for coupling the drive element 13 and the output element 14 formed as a spindle rod. The operating principle of the coupling device 20 is explained in yet greater detail below with reference to the detailed views shown in FIG. 5 and FIG. 6, respectively. The coupling device 20 comprises a first coupling element 21, which is displaceable between a decoupling position shown in FIG. 2 and FIG. 5, respectively, and a coupling position shown in FIG. 6 by actuation of the drive element 13, as explained in greater detail below.

Figure 5:
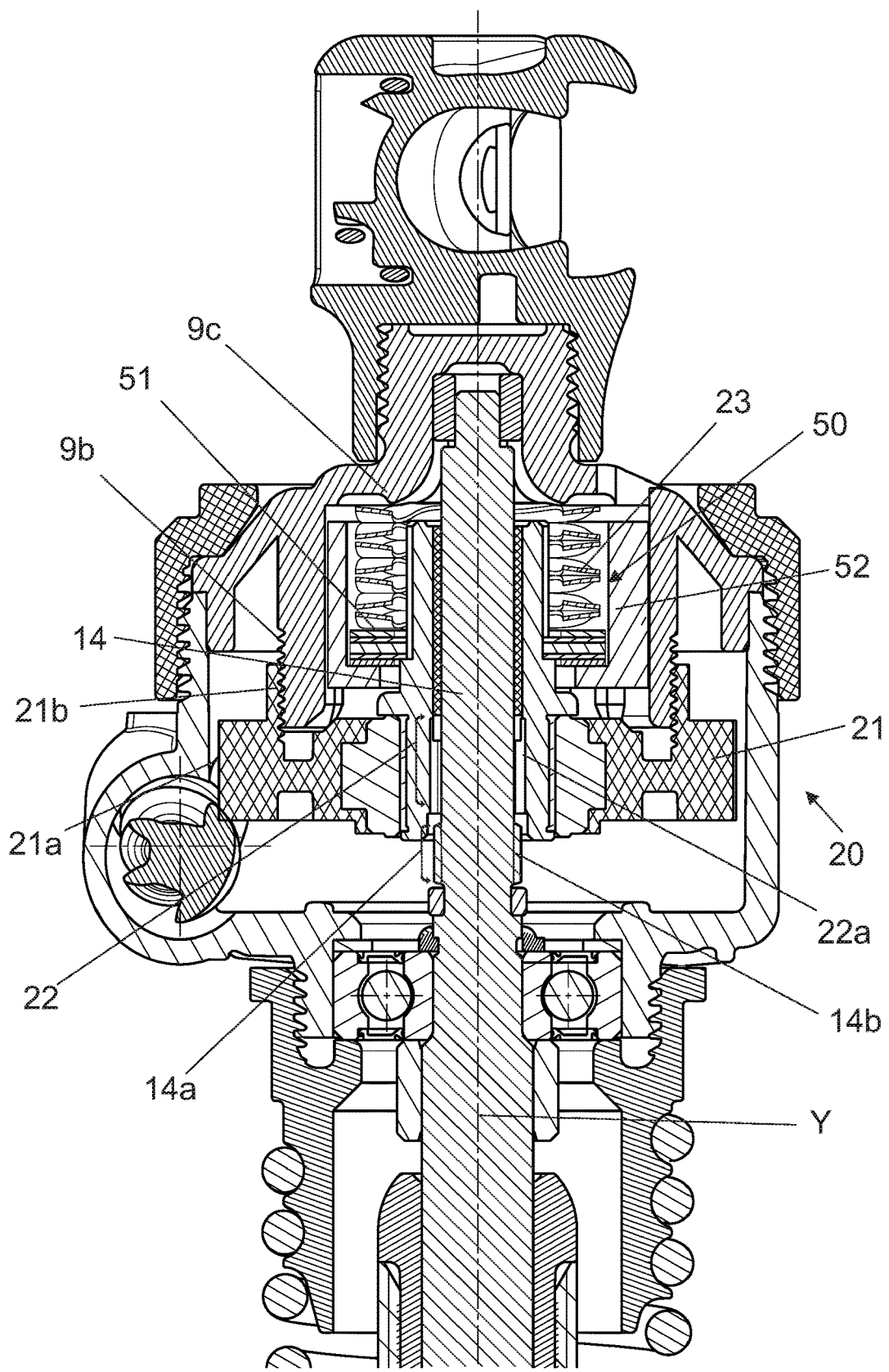
FIG. 5 shows an enlarged detail view from FIG. 2 in the region of the coupling device in the decoupling position.

In FIG. 2 and in FIG. 5, respectively, the coupling device 20 is shown in a decoupled state or in a decoupling position, in which there is no coupling between the drive element 13 and the output element 14 formed as a spindle rod. In this decoupled state of the coupling device 20, the spindle rod 14 is freely rotatable in the ball bearing 16 so that a vehicle panel connected to the drive device 1 can be relatively easily adjusted manually between an open position and a closed position with the assistance of the spring part 7.

Figure 3:
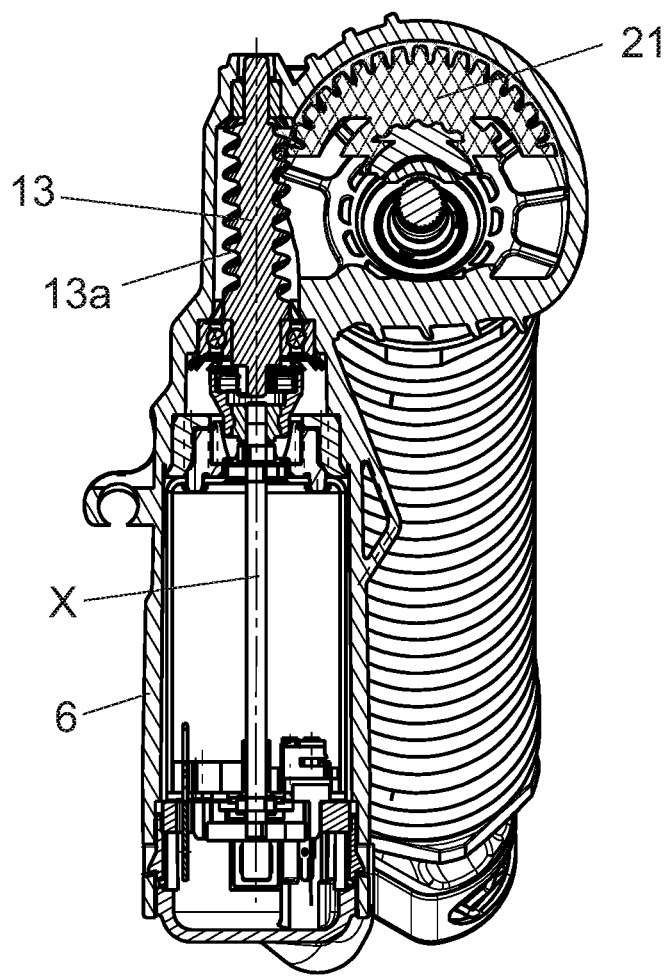
FIG. 3 shows the drive device from FIG. 1 in transverse sectional view along the line of section B-B shown in FIG. 1.

FIG. 3 shows the drive device from FIG. 1 in a cross-sectional view along the line of section B-B shown in FIG. 1. In this view, a cross-section through the motor 6 designed as an electric motor and the drive element 13 designed as a worm shaft driven by the motor 6 is shown. The worm shaft 13 is advantageously rotatably driven about the drive axis X. In the decoupled state of the coupling device, the worm shaft 13 meshes with its external thread 13a with the first coupling element 21, which is formed as a worm gear, so that a driven rotation of the worm gear 21 occurs when the worm shaft 13 is actuated.

Figure 4:
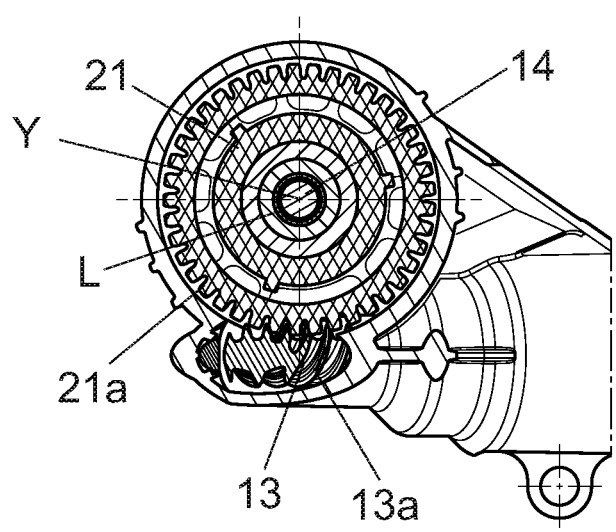
FIG. 4 shows the drive device from FIG. 1 in a cross-sectional view along the line of section C-C shown in FIG. 1.

FIG. 4 shows the drive device of FIG. 1 in a cross-sectional view along the line of section C-C shown in FIG. 1. In this view, a cross-section through the first coupling element 21 designed as a worm gear can be seen. The worm gear 21 has a circumferential outer toothing 21a, the outer toothing 21a being in threaded engagement with the external thread 13a of the worm shaft 13. The first coupling element 21, which is designed as a worm gear, is arranged concentrically about the output axis Y, which is perpendicular to the plane of the paper, and is mounted rotatably about this axis. In this case, the worm gear 21 is centrally penetrated by the output element 14 formed as a spindle rod, a radial distance or gap L being provided between the output element 14 formed as a spindle rod and an inner circumference of the worm gear 21 so that the spindle rod 14 is freely rotatable relative to the worm gear 21.

As can be seen from FIGS. 1, 3 and 4, in the first exemplary embodiment shown here, an angle is provided between the drive axis X, or the worm shaft 13 extending along the drive axis X and the output axis Y or the drive element 14 extending along the output axis Y and formed as a spindle rod. Furthermore, the drive axis X and the output axis Y are axially spaced apart from one another.

FIG. 5 shows an enlarged detail view from FIG. 2 in the region of the coupling device 20, which is in the decoupling position. The output element 14 formed as a spindle rod has a coupling portion 14a, which is provided for coupling the output element 14 to the first coupling element 21 or to a mating coupling portion 22 of the first coupling element 21. The mating coupling portion 22 of the first coupling element 21 is formed as a hollow-cylindrical extension through which the output element 14 passes. The coupling portion 14a of the output element 14 is arranged axially between the coupling element 21 or the mating coupling portion 22 and the ball bearing 16. In the decoupled state of the coupling device 20 shown here, the coupling portion 14a and the mating coupling portion 22 are axially spaced apart from each other, so that there is no coupling between the coupling element 21 and the output element 14 and thus no coupling between the drive element 13 and the output element 14.

A spline 14b is arranged in the coupling portion 14a of the output element 14, the teeth of said spline extending longitudinally along the output axis Y In the mating coupling portion 22 of the coupling element 21, there is arranged an internal spline 22a which is complementary to the spline 14b, so that when the coupling portion 14a of the output element 14 and the mating coupling portion 22 of the coupling element 21 overlap, a rotationally interlocking connection can be produced, which is achievable by axial displacement of the coupling element 21 along the output axis Y The worm gear 21 has a hollow-cylindrical internal thread portion 21b, which is in threaded engagement with a pipe thread 9b provided on the first housing part 9, so that when the drive element 13, which is designed as a worm shaft and is in threaded engagement with the outer toothing 21a, is actuated, the worm gear 21 is displaced axially along the output axis Y together with the mating coupling portion 22. In this case, the internal thread portion 21b projects axially from an end face of the worm gear 21 facing away from the ball bearing 16, so that unscrewing the internal thread portion 21b from the pipe thread 9b of the first housing part 9 causes the worm gear 21 or the mating coupling portion 22 to be displaced axially in the direction of the ball bearing 16.

Accordingly, actuation of the worm shaft 13 causes the worm gear 21, and with it the mating coupling portion 22, to rotate and at the same time to be displaced axially in the direction of the coupling portion 14a of the output element 14. As a result, the coupling portion 14a of the output element 14 and the mating coupling portion 22 overlap from a certain point, the spline 14b of the output element 14 then meshing with the inner spline 22a of the mating coupling portion 22, thus creating a rotationally fixed connection between the mating coupling portion 22 or the first coupling element 21, which is designed as a worm gear, and the output element 14, which is designed as a spindle rod.

Furthermore, between an internal stop face 9c of the first housing part 9 and the first coupling element 21, there is arranged a biasing means 23 designed as a disk spring assembly, which in a first function ensures that the first coupling element 21 is biased in the direction of the ball bearing 16 after the coupling element 21 or the internal thread portion 21b of the coupling element 21 has been completely unscrewed from the pipe thread 9b of the first housing part 9 by actuation of the drive element 13, so that it is advantageously ensured that the inner spline 22a of the mating coupling portion 22 is further engaged on the spline 14b of the output element 14 and the complete rotationally interlocking coupling between the output element 14, which is designed as a spindle rod, and the coupling element 21 is ensured.

Further, the drive device 1 comprises a brake device 50 comprising a brake disk assembly 51 and a brake housing part 52 arranged in a rotationally fixed manner on an inner circumference. The brake housing part 52 is axially displaceable here along an inner circumference of the pipe thread 9b of the first housing part 9. In this case, the brake disk assembly 51 comprises, on the one hand, one or more first brake disks which are connected in a rotationally fixed manner to the brake housing part 52 and, on the other hand, one or more second brake disks which are coupled in a rotationally fixed manner to the mating coupling portion 22 of the coupling element 21. Advantageously, in the decoupling position of the coupling device 20 shown here, the braking device 50 is also initially not coupled to the output element 14, so that the drive element 14, which is designed as a spindle rod, can rotate freely and smoothly in manual operation.

Figure 6:
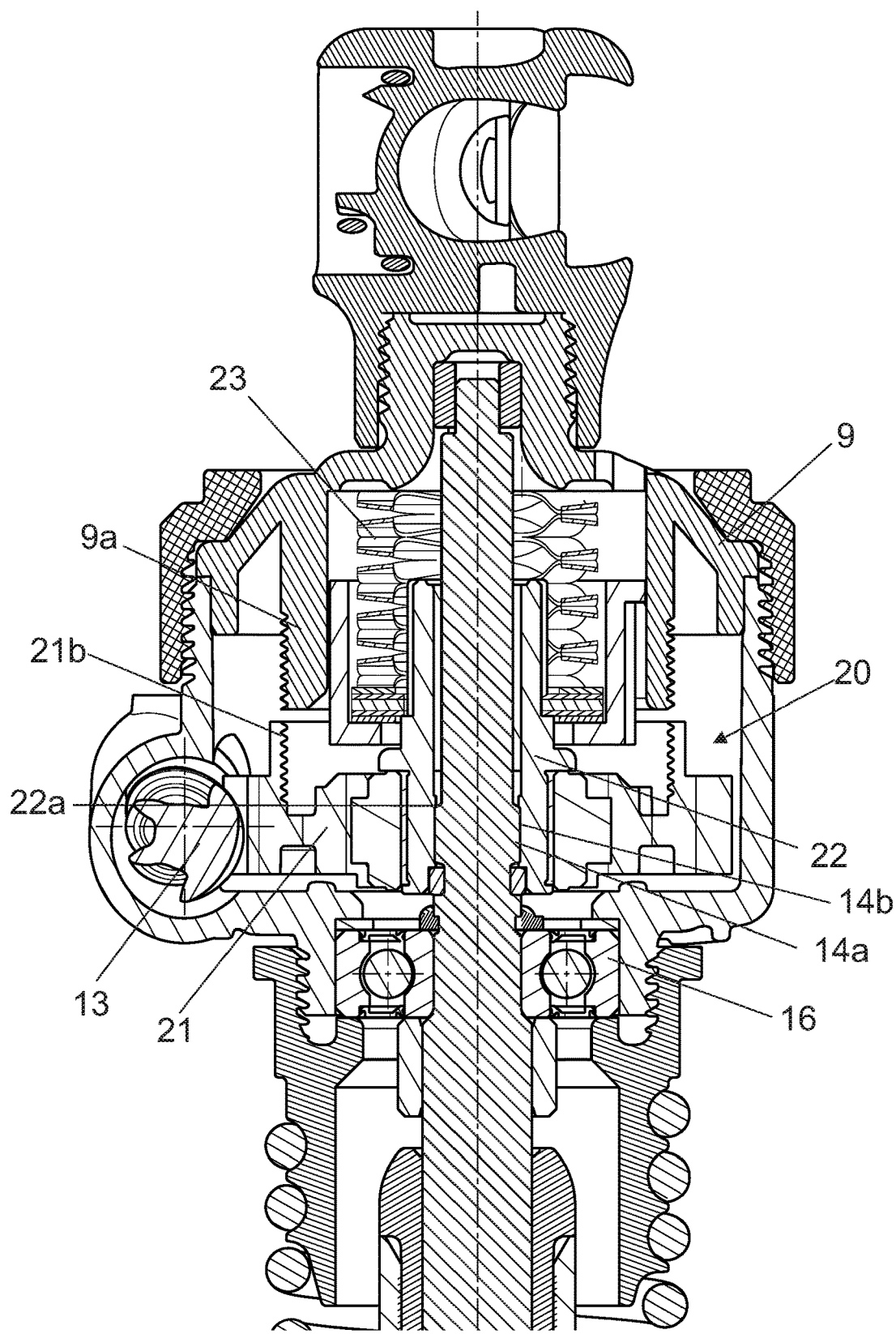
FIG. 6 shows an enlarged detail view in the region of the coupling device in the coupling position.

FIG. 6 shows an enlarged detail view in the region of the coupling device 20 in the coupling position. In the shown coupling position of the coupling device 20, the internal thread portion 21b of the worm gear 21 has been completely decoupled or unscrewed from the pipe thread 9b of the first housing part 9 by means of the actuation of the worm shaft 13, and the coupling element 21 formed as a worm gear has been axially displaced together with the mating coupling portion 22 toward the ball bearing 16 under the bias of the biasing means 23. As a result, the coupling portion 14a of the output element 14 and the mating coupling portion 22 of the coupling element 21 overlap so that the inner spline 22a of the mating coupling portion 22 meshes with the spline 14b of the output element 14, thus establishing a rotationally fixed connection between the drive element 13 and the output element 14 via the coupling element 21. Accordingly, the output element 14, which is designed as a spindle rod, is now driven in both directions when the drive element 13, which is designed as a worm shaft, is further actuated, so that the drive device 1 can effect a driven pivoting of a vehicle panel in both the opening and closing directions. At the same time, the braking device 50 is now also actively coupled, since the second braking elements of the brake disk assembly 51 are coupled in a rotationally fixed manner to the mating coupling portion 22 of the coupling element 21.

Figure 7:
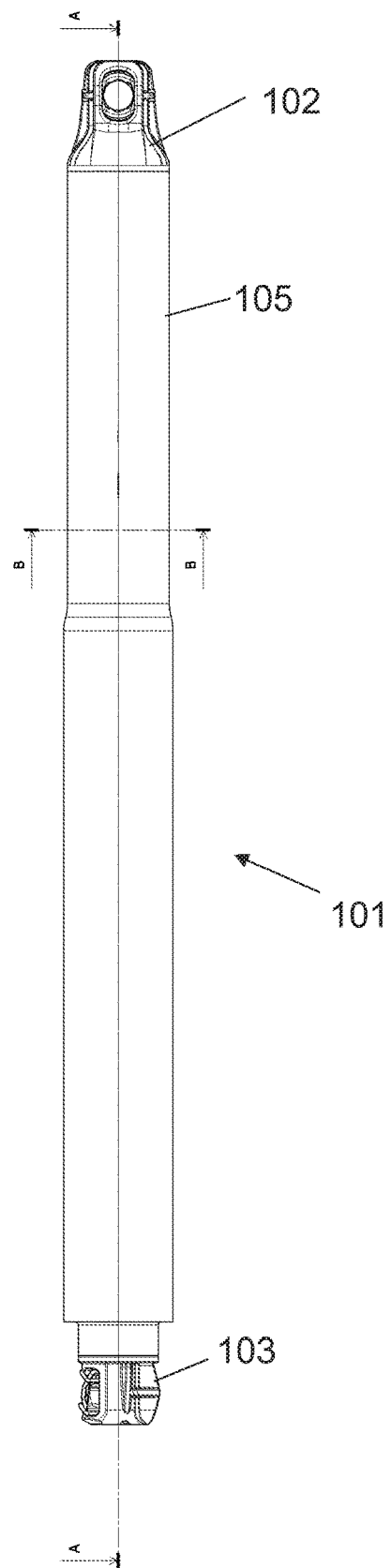
FIG. 7 shows a second exemplary embodiment of a drive device according to the present disclosure in a front view.

FIG. 7 shows a second exemplary embodiment of a drive device 101 according to the present disclosure in a front view. Components which are structurally identical to the first exemplary embodiment shown in FIG. 1 to 6 are provided with the same reference signs, whereas structurally modified parts have been given a reference sign incremented by 100.

The drive device 101 comprises a first joint part 102 formed as a ball socket and a second joint part 103 formed as a ball socket, which are arranged at opposite ends of the drive device 101. The drive device 101 further comprises a drive train 104 shown in FIG. 8, which is arranged in a housing 105. In contrast to the first exemplary embodiment shown in FIG. 1, the drive train 104 is arranged parallel to a longitudinal axis of the drive device 101, rather than transversely.

Figure 8:
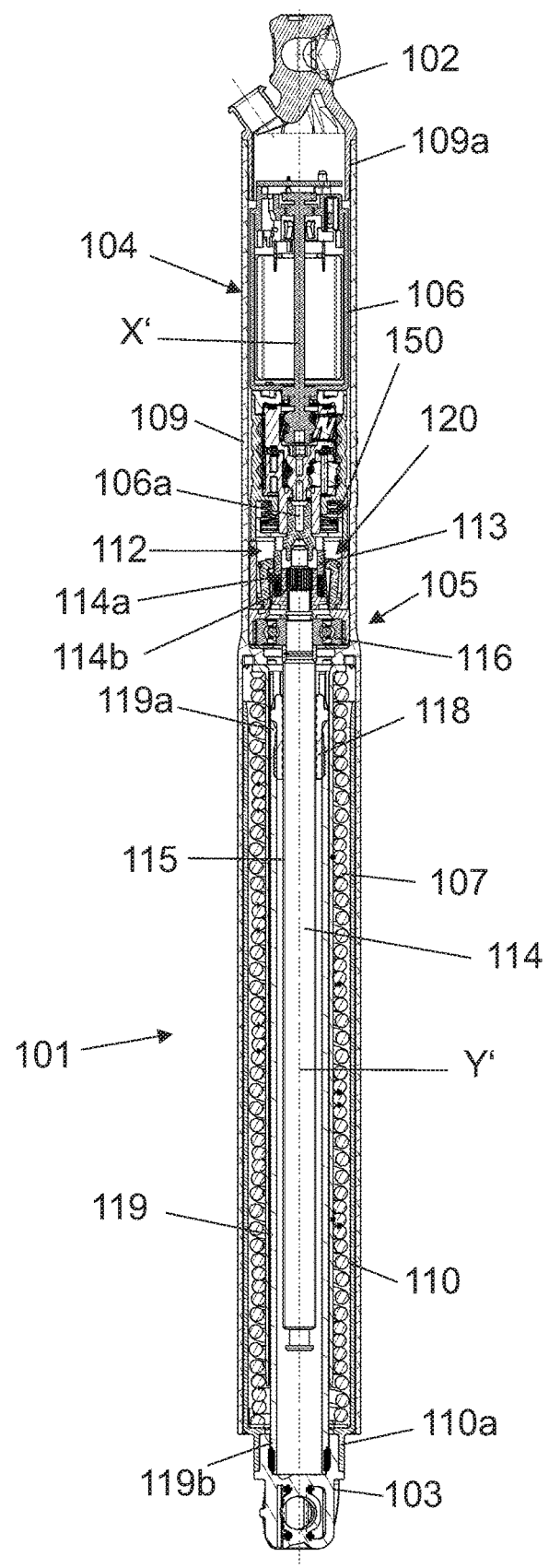
FIG. 8 shows the drive device from FIG. 7 in a longitudinal sectional view along the line of section A-A shown in FIG. 7.

FIG. 8 shows the drive device 101 of FIG. 7 in a longitudinal sectional view along the line of section A-A shown in FIG. 7. The drive device 101 comprises a telescopic housing 105, the housing 105 comprising a first housing part 109 and a second housing part 110, which are nested one inside the other so as to be axially displaceable relative to one another. A motor 106 belonging to a drive train 104 and designed as an electric motor is arranged stationarily and in a rotationally fixed manner in the housing 105, said motor being provided for a motor-driven displacement of the first housing part 109 relative to the second housing part 110. The housing 105 forms a telescopic linear guide.

Further, a spring part 107 formed as a coil spring is disposed in the housing 105, which spring part biases the first housing part 109 toward the second housing part 110. The first joint part 102 is fastened to an open end 109a of the first housing part 109 by crimping or welding (for example, laser welding). The opposite, second joint part 103, on the other hand, is arranged at a closed end 110a of the second housing part 110, the second joint part 103 being connected to a guide tube 119 partially extending through the housing 105 and protruding from the housing 105.

An output element 114 designed as a spindle rod with an external thread 115 is guided radially in the guide tube 119, a spindle nut 118 in threaded engagement with the external thread 115 of the output element 114 being arranged stationarily and in a rotationally fixed manner at a first, open end 119a of the guide tube 119, so that a displacement of the guide tube 119 along an output axis Y' can be effected by a rotation of the spindle rod 114 or of the external thread 115. The spindle rod 114 is rotatably mounted via a ball bearing 116. The second joint part 103 is attached to a second end 119b of the guide tube 119 opposite the first end 119a by a screw connection.

A drive element 113 projects into a cavity 112 provided in the first housing portion 109 and is connected in a rotationally fixed manner to an output shaft 106a of the motor 106. Further, the drive device 101 comprises a coupling device 120, which can be brought by actuation or, in the present exemplary embodiment, by a rotation of the drive element 113 about a drive axis X' from an decoupled state, shown here, in which the drive element 113 and the output element 114 formed as a spindle rod are decoupled, into a coupled state, in which the drive element 113 and the output element 114 formed as a spindle rod are coupled via the coupling device 120. The output element 114 has a coupling portion 114a, which is provided for coupling with the coupling device 120. A spline 114b is arranged in the coupling portion 114a. Further, the drive device comprises a braking device 150 arranged in the first housing portion 109.

Figure 9:
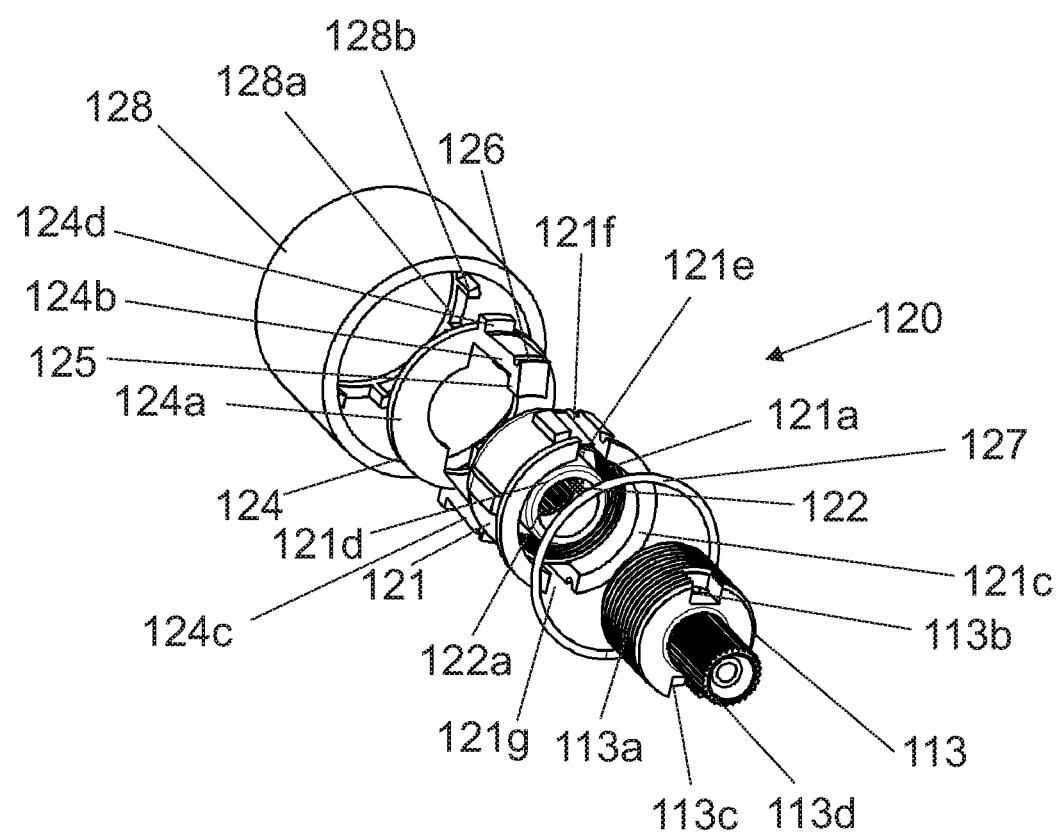
FIG. 9 shows an exploded view of the coupling device 120 in an isometric view.

FIG. 9 shows an exploded view of the coupling device 120 in an isometric view. In this illustration, both the individual parts of the coupling device 120 and the drive element 113 are shown. The coupling device 120 comprises a first coupling element 121 and a second coupling element 124, which are connected to each other. The first coupling element 121 has an internal thread 121a engageable with an external thread 113a provided on an outer circumference of the drive element 113. Further, the first coupling element 121 comprises a mating coupling portion 122 which is provided for coupling with the coupling portion 114a of the output element 114. An inner spline 122a is arranged in the mating coupling portion 122 and is formed complementarily to the spline 114b of the coupling portion 114a of the output element 114.

The first coupling element 121 has an outer hollow cylinder 121c and an inner hollow cylinder 121d, the outer hollow cylinder 121c and the inner hollow cylinder 121d being connected to each other by an annular base 121e. The outer hollow cylinder 121c has the internal thread 121a on its inner side, and the inner hollow cylinder 121d has the inner spline 122a on its inner side.

The first coupling element 121 has a first slot-shaped recess 121f and an opposite, second slot-shaped recess 121g on its outer hollow cylinder 121c, which are provided for rotationally fixed connection between the first coupling element 121 and the second coupling element 124. In this case, the first recess 121f and the second recess 121g are arranged facing the drive element 113 and extend in the axial longitudinal direction of the coupling device 120.

The drive element 113 has a first groove-shaped recess 113b and an oppositely arranged second groove-shaped recess 113c on its outer circumference, which, as will be explained in greater detail below, are provided for rotationally fixed connection between the drive element 113 and the second coupling element 124 in the coupling position of the coupling device 120. The recesses 113b, c are arranged at an axial end of the external thread 113a of the drive element 13 facing away from the first coupling element 121 and the second coupling element 124, respectively. The drive element 113 further comprises a hollow-cylindrical extension 113d, which is provided for coupling with the output shaft 106a of the motor 106 (cf. FIG. 8). The extension 113d is arranged facing away from the coupling device 120.

The second coupling element 124 has an annular main body 124a and a first latching element 124b projecting axially from the annular main body 124a toward the first coupling element 121, and a second latching element 124c arranged radially opposite and projecting axially toward the first coupling element 121. The first latching element 124b and the second latching element 124c are each formed as latching hooks with a radially inwardly projecting lug 125. The latching hooks can thus be inserted advantageously with the radially inwardly projecting lug 125 in the first slot-shaped recess 121e or the second slot-shaped recess 121f of the first coupling element 121, so that the first coupling element 121 and the second coupling element 124 are designed to be largely rotationally fixed relative to one another.

On an outer side facing away from the respective lug 125, the latching hooks 124b, c each have a groove-shaped receptacle 126, which is provided for receiving an annular biasing means 127. In the present second exemplary embodiment, the biasing means 127 is formed as a rubber ring, which thus advantageously biases the latching elements 124b, c radially inward. Advantageously, the latching elements 124b, c are biased in such a way that the projecting lugs 125 can latch into the groove-shaped recesses 113b, c.

Further, the coupling device 120 comprises a hollow-cylindrical coupling housing 128 having an annular base 128a, latching ridges 128b projecting in the axial direction from the annular base 128a being provided and engaging with latching projections 124d projecting radially outwardly from the annular main body 124a of the second coupling element 124, at least in the decoupling position of the coupling device 120. Advantageously, the first coupling element 121 and the second coupling element 124 are secured in a rotationally fixed manner relative to the coupling housing 128 in the decoupling position of the coupling device 120.

Figure 10:
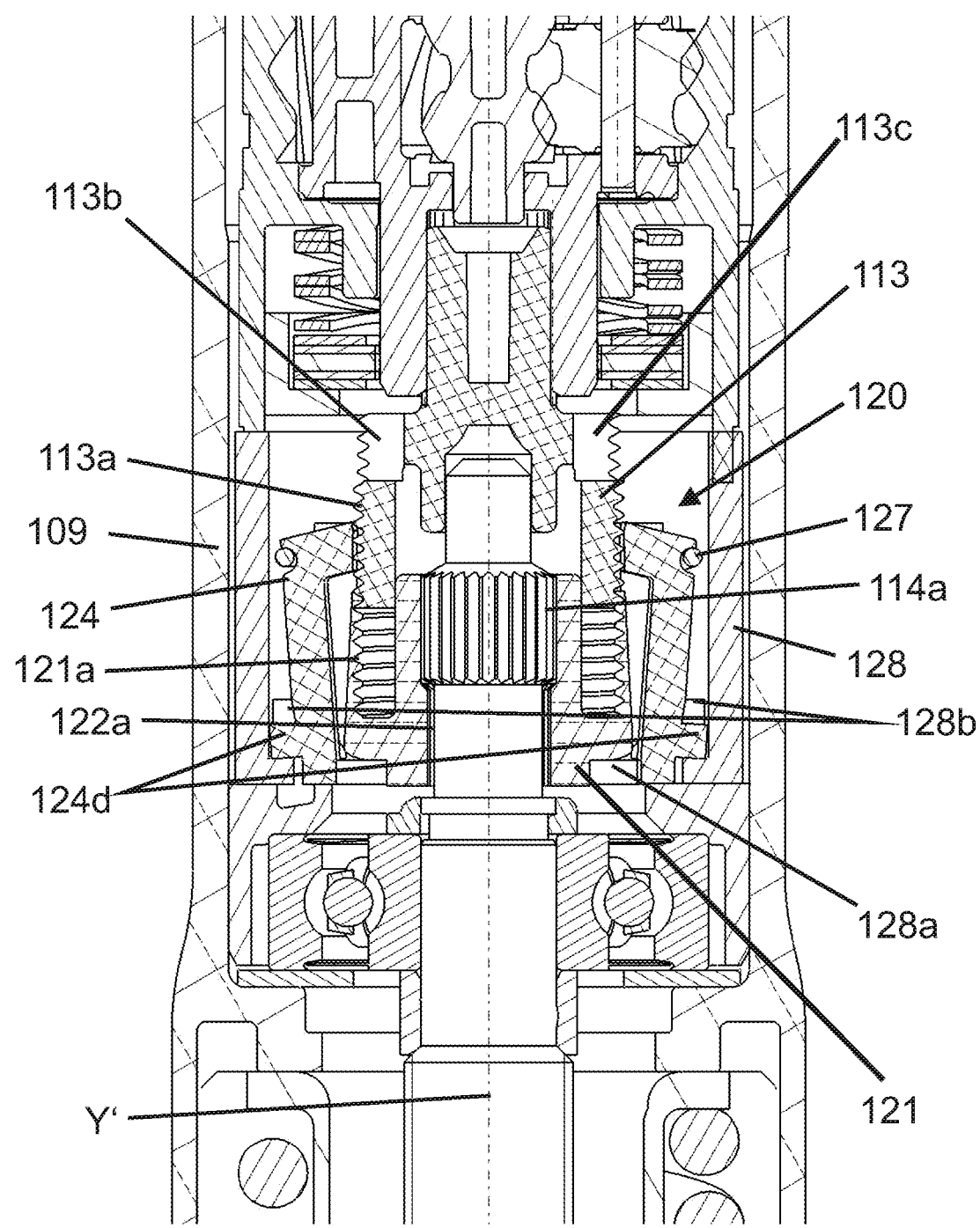
FIG. 10 shows an enlarged detail view from FIG. 8 in the region of the coupling device in the decoupling position.

FIG. 10 shows an enlarged detail view from FIG. 8 in the region of the coupling device 120 in the decoupling position. In the decoupling position shown here, the external thread 113a of the drive element 113 and the internal thread 121a of the first coupling element 121 mesh with each other, so that by rotating the drive element 113 about the drive axis X' or the output axis Y', the first coupling element 121 together with the second coupling element 124 can be displaced axially along the drive axis X' or the output axis Y' in the direction of the coupling position.

The latching projections 124d of the second coupling element 124 overlap axially with the latching ridges 128b projecting from the annular base 128a, so that the second coupling element 124 and, with it, also the first coupling element 121 are secured in a rotationally fixed manner relative to the coupling housing 128. Advantageously, however, the first coupling element 121 and the second coupling element 124 are axially displaceable relative to the coupling housing 128. The coupling housing 128 is fixed to an inner side of the first housing part 109, such that the coupling housing 128 is arranged both stationarily and rotationally fixedly with respect to the first housing part 109.

Advantageously, this ensures that the first coupling element 121 and the second coupling element 124 cannot rotate during a first actuation, i.e., rotation of the drive element 113 about the drive axis X, but are displaceable axially upward.

In the decoupling position shown here, the first latching hook 124b and the second latching hook 124c, which are biased inward by the biasing means 127, rest on the external thread 113a of the drive element 113, so that the lugs 125 do not yet project into the recesses 113b, c. Since both the first coupling element 121 and the second coupling element 124 are displaced axially upward by the actuation, i.e., in the present case by rotation of the drive element 113 about the drive axis X, the lugs 125 of the latching hooks 124b, c are also displaced in the direction of the groove-shaped recesses 113b, c. At the same time, the inner spline 122a is displaced toward the spline 114a of the output element 114, which is formed as a spindle rod, so that the inner spline 122a begins to mesh with the spline 114a to thus make a rotationally fixed connection between the first coupling element 121 and the output element 114.

Figure 11:
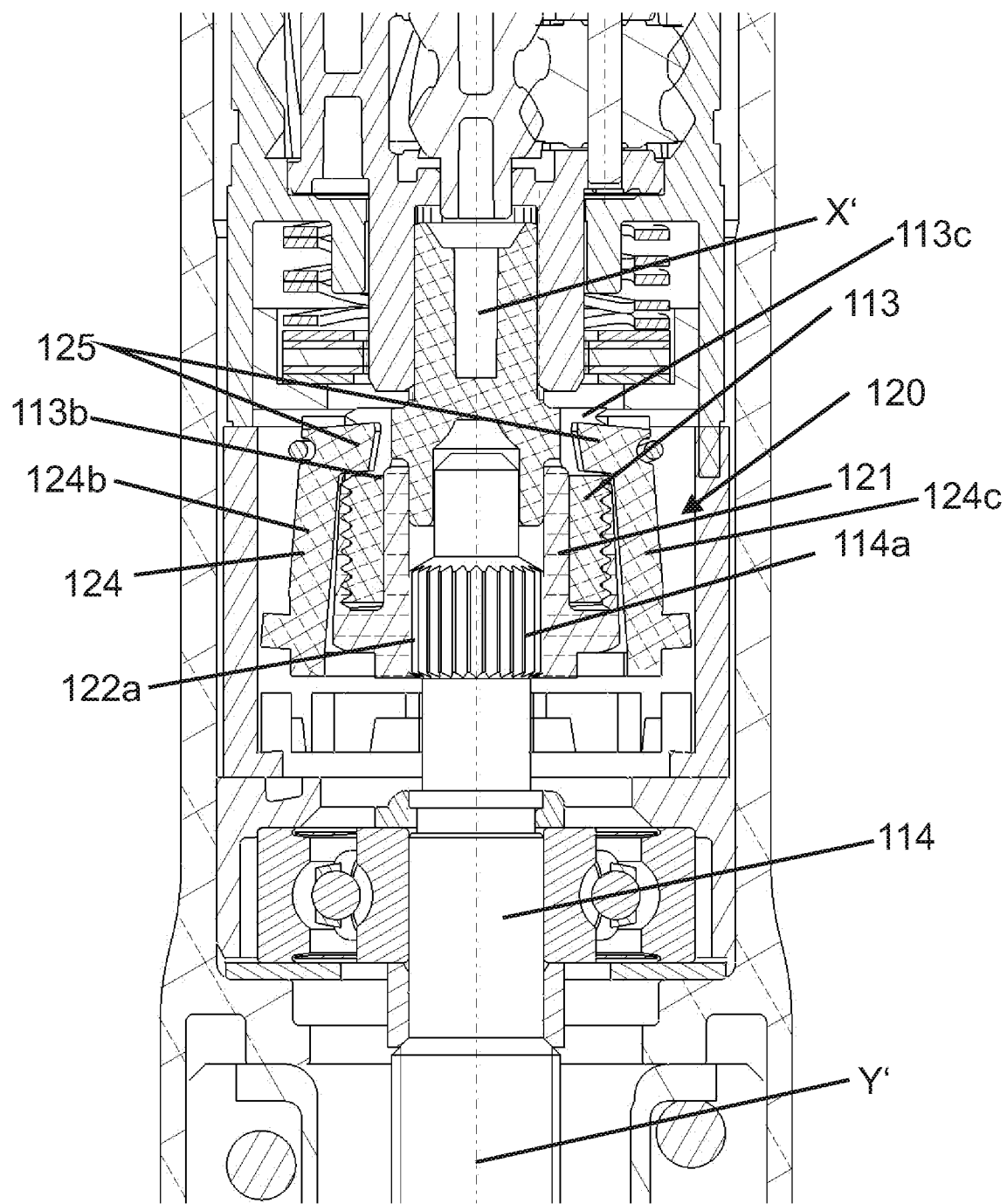
FIG. 11 shows an enlarged detail view in the region of the coupling device in the coupling position.

FIG. 11 shows an enlarged detailed view in the region of the coupling device 120 in the coupling position. As can be seen, rotation of the drive element 113 has caused the first coupling element 121 to be displaced axially upward along the drive axis X' or the drive axis Y' due to the mutually existing thread engagement. Together with the first coupling element 121, the second coupling element 124 was also moved axially upward. As a result, the inner spline 122a has been pushed onto the spline 114a of the output element 114 so that a rotationally fixed connection exists between the drive element 114 and the first coupling element 121. Further, the axial displacement of the first coupling element 121 caused the latching hooks 124b, c or the lugs 125 to be engaged in the groove-shaped recesses 113b, c of the drive element 113 under the bias of the biasing means 127, thereby making a rotationally fixed connection between the first coupling element 121 and the drive element 113.

Further, the latching projections 124d of the second coupling element 124 have been displaced upward to such an extent that the latching projections 124d no longer axially overlap the latching ridges 128b projecting from the annular base 128a and thus no longer secure the first coupling element 121 and the second coupling element 124 against rotation relative to the coupling housing 128. Accordingly, the first coupling element 121 and the second coupling element 124 rotate together with the drive element 113 about the drive axis X' and drive axis Y', respectively, the first coupling element 121 and the second coupling element 124 providing a rotationally fixed connection between the drive element 113 and the output element 114 formed as a spindle rod. Accordingly, the output element 114 is now rotatably driven by the drive element 113. The telescopic linear guide consisting of the first housing part 109 and second housing part 110, which allows manual actuation, has been transformed into an electric linear drive by bringing the drive device 101 into operative engagement with the linear guide.

Figure 12:
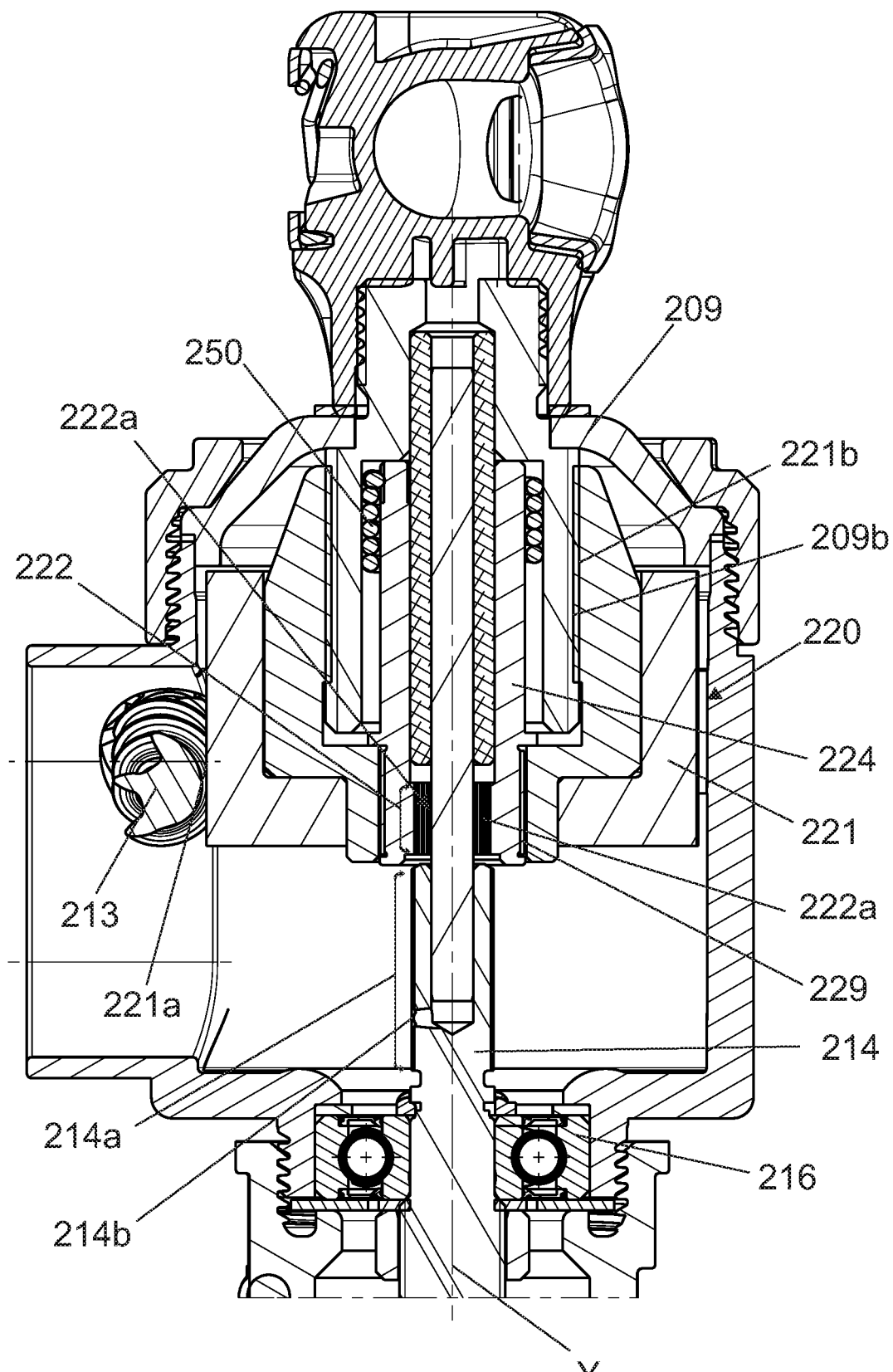
FIG. 12 shows a further exemplary embodiment of a coupling device 220 in the decoupling position in a longitudinal sectional view.

FIG. 12 shows another exemplary embodiment of a coupling device 220 in the decoupling position in a longitudinal sectional view. The output element 214, which is formed as a spindle rod, has a coupling portion 214a. A spline 214b is arranged in the coupling portion 214a, the teeth of which extend longitudinally along the output axis Y of the output element 214. The coupling device 220 further comprises a first coupling element 221 and a second coupling element 224, the first coupling element 221 being formed as a worm gear and radially surrounding the second coupling element 224. The first coupling element 221 is coupled to the second coupling element 224 via a slip clutch 229. In the present exemplary embodiment, the slip clutch 229 comprises a tolerance ring which is radially disposed between the first coupling element 221 and the second coupling element 224. Advantageously, this allows the first coupling element 221 to rotate relative to the second coupling element 224 when a fixedly defined threshold value of a torque acting between the first coupling element 221 and the second coupling element 224 is exceeded, the first coupling element 221 remaining axially fixed relative to the second coupling element 224 at all times.

The second coupling element 224 has a mating coupling portion 222, which is engageable with the coupling portion 214a of the output element 214 by axially displacing the first coupling element 221 and the second coupling element 224. In the decoupled state of the coupling device 220 shown here, the coupling portion 214a and the mating coupling portion 222 are axially spaced apart from each other, so that there is no coupling between the first coupling element 221 or second coupling element 224 and the output element 214, and an adjustment of a vehicle panel can only be performed manually. A braking device 250 configured as a wrap spring brake is arranged at an end of the second coupling element 224 opposite the mating coupling portion 222.

In the mating coupling portion 222 of the second coupling element 224, there is arranged an inner spline 222a which is complementary to the spline 214b, so that when the coupling portion 214a of the output element 214 and the mating coupling portion 222 of the second coupling element 224 overlap, a rotationally interlocking connection can be produced, which is achievable by axial displacement of the first coupling element 221 or the second coupling element 224 along the output axis Y.

The first coupling element 221 formed as a worm gear with an outer toothing 221a has a hollow-cylindrical internal thread portion 221b, which is in threaded engagement with a pipe thread 209b provided on a first housing part 209, so that, upon actuation of a drive element 213, which is formed as a worm shaft and is in threaded engagement with the outer toothing 221a, an axial displacement of the first coupling element 221, which is formed as a worm gear, together with the second coupling element 224 axially along the output axis Y in the direction of the ball bearing 216 or the coupling portion 214a of the first coupling element 221 is caused.

Accordingly, the actuation of the drive element 213 in a first direction of rotation causes the first coupling element 221 formed as a worm gear and the mating coupling portion 222 of the second coupling element 224 to rotate, and at the same time axially displaces them in the direction of the coupling portion 214a of the output element 214 formed as a spindle rod. As a result, the coupling portion 214a of the output element 214 and the mating coupling portion 222 of the second coupling element 224 overlap from a certain point, the spline 214b of the output element 214 then meshing with the inner spline 222a of the mating coupling portion 222, thus creating a rotationally fixed connection between the mating coupling portion 222 or the second coupling element 224 and the output element 214, which is designed as a spindle rod.

Figure 13:
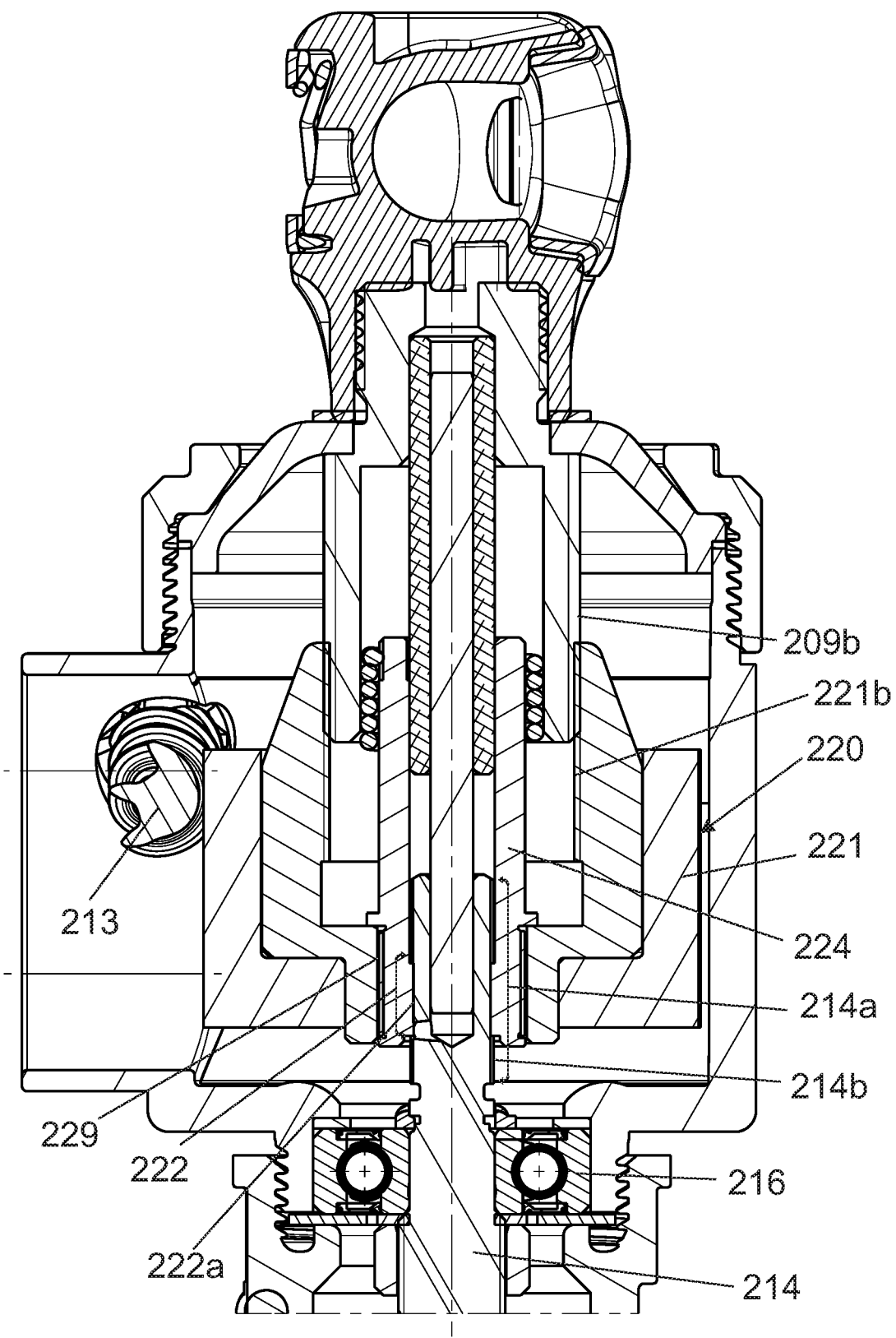
FIG. 13 shows the coupling device 220 from FIG. 12 in the coupling position.

FIG. 13 shows the coupling device 220 from FIG. 12 in the coupling position. In the coupling position of the coupling device 220 shown, the first coupling element 221 formed as a worm gear has been axially displaced together with the mating coupling portion 222 of the second coupling element 224 toward the ball bearing 216. As a result, the coupling portion 214a of the output element 214 and the mating coupling portion 222 of the second coupling element 224 overlap so that the inner spline 222a of the mating coupling portion 222 meshes with the spline 214b of the output element 214, thus establishing a coupling between the drive element 213 and the output element 214 via the first coupling element 221 and the second coupling element 224. Accordingly, the output element 214, which is designed as a spindle rod, is now driven rotatably in both directions when the drive element 213, which is designed as a worm shaft, is further actuated, so that a driven pivoting of a vehicle panel can be effected in both the opening and closing directions.

Compared to the exemplary embodiment of a coupling device 20 shown in FIG. 5 and FIG. 6, respectively, the pipe thread 209b and the internal thread portion 221b, respectively, have a longer design, so that advantageously the internal thread portion 221b remains in engagement with the pipe thread 209b even when the first coupling element 221 and the second coupling element 224, respectively, are completely displaced into the coupling position as shown here. Particularly advantageously, in the exemplary embodiment shown here, it is accordingly possible, by actuation of the drive element 213 in a first direction of rotation, which corresponds to a closing movement of a vehicle panel, not only to displace the coupling device 220 from the decoupling position shown in FIG. 12 into the coupling position shown here, which couples the drive element 213 and the output element 214 to one another, but also to displace the coupling device 220 back from the coupling position into the decoupling position by actuating the drive element 213 in a second direction of rotation, which is opposite the first direction of rotation.

For example, the exemplary embodiment of a coupling device 220 shown in FIGS. 12 and 13 allows a user to use the drive function only temporarily and, accordingly, to deactivate it again after a certain time has elapsed. Specifically, to activate the drive function, the vehicle panel is first manually displaced into a fully open end position. Subsequently, the drive element 213 is motor-driven in a first direction of rotation, which corresponds to a driven closing movement of the vehicle panel. As a result, the first coupling element 221 is axially displaced due to thread engagement between the pipe thread 209b and the internal thread portion 221b, thereby establishing a coupling between the second coupling element 224 coupled to the first coupling element 221 via the slip clutch 229 and the output element 214. The slip clutch 229 is adjusted so that it does not slip during normal operation, i.e., when the vehicle panel is driven between the open and closed positions, and so that the corresponding torque required to rotate the output element 214 is transmitted.

The drive element 213 is rotated in the first direction until the vehicle panel is completely closed. However, when the vehicle panel is fully closed, the drive element 213 is rotated a little further so that the first coupling element 221 is likewise rotated further relative to the second coupling element 224, at which point the slip clutch 229 slips. In this case, the second coupling element 224 is axially displaced a little further in the direction of the ball bearing 216 so that, when the vehicle panel is driven into the fully open end position, there is still sufficient overlap between the coupling portion 222 of the second coupling element 224 and the mating coupling portion 214a of the output element 214.

If the user decides to no longer use the drive function that may be provided in a subscription model, the deactivation is preferably implemented by driving the drive element 213 in the second direction of rotation, which corresponds to an opening movement of the vehicle panel, when the vehicle panel is closed. Accordingly, the first coupling element 221 rotates about the output axis Y and is axially displaced away from the ball bearing 216. During this process, the slip clutch 229 slips accordingly as the second coupling element 224 is still initially engaged with the output element 214. However, the second coupling element 224 is axially displaced together with the first coupling element 221 until the coupling portion 222 of the second coupling element 224 no longer overlaps with the mating coupling portion 214a of the output element of 214 and thus the coupling between the first coupling element 221 or second coupling element 224 and the output element 214 is canceled and the coupling device 220 again reaches the decoupling position shown in FIG. 12.

The present disclosure has been explained above with reference to an exemplary embodiment in which a braking device of the input device is provided, which braking device is coupled to the output element together with the drive element by means of the coupling device, the braking device being designed as a multi-disk brake. It is understood that the braking device can also be designed as an electromagnetically activatable brake, which can be activated separately.

The present disclosure has been explained above with reference to several exemplary embodiments in which a biasing means is provided which biases the first coupling element into the coupling position. It is understood that the first coupling element itself can form such a biasing means, for example by means of components of the first coupling element that are stressed at least in the decoupling position, which causes a latching or the like with the output element.

The present disclosure has been explained above with reference to several embodiments in which the first coupling element has been axially biased in the direction of the coupling position by a biasing means, or in which the first coupling element is secured in the axial direction due to a threaded engagement with the drive element, which ensures that the first coupling element remains in the coupling position. It is understood that further means can also be provided alternatively or additionally, which, for example, effect axial securing of the first coupling element in the coupling position by an interlocking fit. For example, latching points can be provided on the first coupling element and an inner surface of the housing, which effect an interlocking latching of the first coupling element in the coupling position.

The present disclosure has been explained above with reference to several embodiments in which the first coupling element is displaced into the coupling position after actuation of the drive element and subsequently remains there. The first coupling element can only be reset by external mechanical intervention. It is understood that advantageously a resetting device can be provided which resets the first coupling element into the decoupling position, for example a spring system which can be activated from the outside.

The present disclosure has been explained above with reference to several exemplary embodiments which take into account specific installation situations. It is understood that the exemplary embodiments may also be combined with each other, or individual or several of the features of the embodiments may be substituted for each other.

What is claimed is:

1. A drive device for a vehicle panel, comprising:
   a housing;
   a drive element which extends along a drive axis;
   an output element which extends along an output axis; and
   a coupling device which is arranged between the drive element and the output element with at least one first coupling element for coupling the drive element and the output element, wherein the coupling device can be displaced from a decoupling position into a coupling position, in which the drive element and the output element are coupled to one another, by actuating the drive element,
   wherein the first coupling element has a thread which, in the decoupling position of the coupling device, is in engagement with a mating thread, wherein the first coupling element is moved into the coupling position by mutual rotation of the thread and of the mating thread, wherein the mating thread is arranged on the housing.

2. The drive device according to claim 1, wherein the first coupling element is coupled to the drive element and decoupled from the output element before actuation of the drive element or in the decoupling position of the coupling device.

3. The drive device according to claim 1, wherein the first coupling element is axially displaceable in a direction parallel to one of the drive axis and output axis by actuating the drive element.

4. The drive device according to claim 1, wherein the first coupling element and the drive element, in the decoupling position of the coupling device, are in a threaded or gear engagement.

5. The drive device according to claim 1, wherein the drive element is rotatable in a driven manner about the drive axis.

6. The drive device according to claim 5, wherein the first coupling element is displaced axially into the coupling position by rotating the drive element about the drive axis.

7. The drive device according to claim 1, wherein the thread is designed as an internal thread and the mating thread is designed as an external thread.

8. The drive device according claim 1, wherein the mating thread is a pipe thread provided on a first housing part.

9. The drive device according to claim 1, wherein the drive element drives a rotation of the first coupling element about the output axis, wherein the first coupling element is moved axially into the coupling position by the rotation of the first coupling element about the output axis, which rotation is driven by the drive element.

10. The drive device according to claim 1, wherein the output element is designed as a spindle rod with an external thread.

11. The drive device according to claim 1, wherein the first coupling element is designed as a worm gear rotatable about the output axis.

12. The drive device according to claim 11, wherein the drive element is designed as a worm shaft, the coupling element designed as a worm gear being in threaded engagement with the worm shaft.

13. The drive device according claim 1, wherein the first coupling element is arranged concentrically to the output axis.

* * * * *